INVENTOR
OSCAR FLEISCHER

BY Arthur A. March.
ATTORNEY

Fig. 21

INVENTOR.
Oscar Fleischer
BY
Arthur A. March
ATTORNEY

United States Patent Office 3,428,268
Patented Feb. 18, 1969

3,428,268
BRAKE FOR FISHING REEL
Oscar Fleischer, 2610 SW. 21st St.,
Miami, Fla. 33145
Continuation-in-part of application Ser. No. 187,157,
Apr. 11, 1962. This application July 7, 1966, Ser.
No. 563,444
U.S. Cl. 242—84.45  5 Claims
Int. Cl. A01k 89/02

ABSTRACT OF THE DISCLOSURE

A fishing reel is provided with a shaft for rotatably supporting a spool having a hollow hub with a braking assembly disposed within the hub for connecting the spool into driving relationship with the shaft. The braking assembly includes a sleeve concentrically disposed within said hub and having a cylindrical portion in spaced relationship thereto. The sleeve has a radially extending end flange with axially directed pin means adapted to cooperate with an aperture means in the end flange to fix the sleeve to the spool. Braking means mounted for free rotation about the shaft engage pressure means disposed along the shaft. Means are provided for effecting relative axial movement between the pressure means and the braking means.

---

This is a continuation-in-part application of application Ser. No. 493,287, filed July 14, 1965, which was a continuation-in-part of Ser. No. 187,157, filed Apr. 11, 1962, both now abandoned.

This invention relates to a brake disposed in the hub of a wheel, and, more particularly, this invention relates to a brake which is adapted to be expanded longitudinally against a braking block connected to a wheel hub or radially into frictional engagement with the interior walls of a bore in a wheel hub.

While the instant invention is useful in various types of wheels, it is of substantial significance in the fishing reel industry. As is perhaps well known, fishing reels are often provided with a brake whereby a fish which has been hooked may be fed line, provided the fish pulls with sufficient force to overcome a counter-balancing force exerted by the brake. In the past, there has been considerable difficulty in keeping the brake element free from moisture so that it will not lose its braking power; and, also, there has been a problem in providing means whereby the brake will impart a smooth, as opposed to a jerky, frictional resistance to a pull exerted by a fish.

Ordinarily, fishing reels are provided with a driving member which engages a spool on the reel so that rotation of the driving member will cause the spool to rotate and wind a line thereon. Many reels require an anti-reverse mechanism, which usually comprises a pawl and a ratchet arrangement that may be employed to restrain rotation of the spool in the reverse direction of rotation imparted to it by the driving member, unless the frictional resistance of a brake is overcome. In the past, there have been many problems associated with anti-reverse mechanisms, and this invention teaches a novel arrangement of such a mechanism.

It is also desirable that the brake be adjustable so that a correct amount of restraining force which it exerts may be selected for catching varying sizes and types of fish. This invention teaches an adjustable brake for a reel that is provided in combination with a reference plate and indicator for controlling the brake, whereby the amount of tension force required to overcome the brake may be selected and adjusted to meet the requirements of the particular use to which the reel is being put, i.e., large fish or small fish.

It is, accordingly, an object of this invention to provide a fishing reel of the type described hereinafter having a housing, a shaft supported by the housing, and a spool rotatably mounted on the shaft and having a central axial bore therethrough, in combination with an adjustable brake disposed in the bore which is adapated to restrain rotation of the spool in one direction and driving means adapted to rotate the spool in an opposing direction.

It is another object of this invention to provide a brake control means operably connected to the brake, whereby the resistance caused by the brake may be adjustably varied through an operating range.

It is also an object of this invention to provide a brake which is so disposed in use that it is relatively free from the deleterious effects of water.

It is still a further object of this invention to provide an anti-reverse mechanism for a fishing reel comprising an arcuate section of a gear adapted to engage and restrain rotation of the driving means in one direction and to permit rotation in the other direction.

It is another object of this invention to provide a brake which is enclosed within a bore provided in a hub of a wheel, whereby water and foreign matter are prevented from reaching said brake, which prevents slippage and makes possible a more durable, longer casting brake.

It is another object to provide an internal brake construction which is separately and detachably connected to a bore of a spool or wheel, and which is acted upon by external means through appropriate connective means for varying the braking force thereof.

Another object is to provide an internal brake construction in which the braking force is not exerted upon the hub or spool.

Still another object is to provide a brake construction upon which a steady braking pressure is maintained so as to eliminate any possibility of an increase in pressure build-up thereon.

Still another object is to provide an internal brake construction in which there is a rapid dispersal or dissemination of heat therefrom.

Still another object is to provide in a fishing reel an arrangement in which various spools may be interchangeably used with a given brake mechanism to enable a fisherman to have a variety of lines available to accommodate various fishing situations.

Still another object is to provide a brake construction which can be simply serviced and which is relatively inexpensive to produce because of the simplicity of its mechanism and its ease of assembly.

It is another object of this invention to provide a device having a wheel and brake in operative relation one to the other, which is relatively simple in construction, strong and durable in use, relatively inexpensive to manufacture, efficient in operation, and otherwise well adapted for the purposes for which the same is intended.

In accordance with these and other objects which will become apparent hereinafter, the instant invention will now be described with reference to the accompanying drawings in which:

Figures 1, 2:
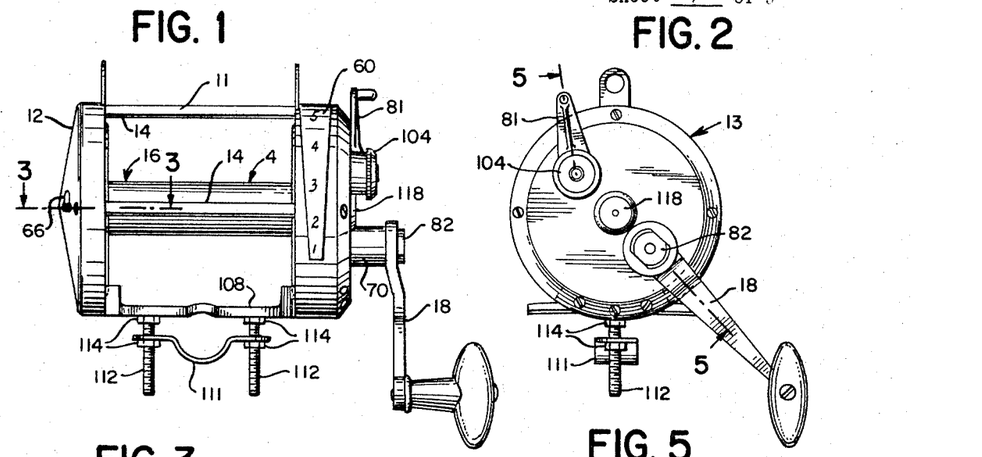
FIG. 1 is an elevation view of a fishing reel.
FIG. 2 is a side elevation view of the fishing reel shown in FIG. 1.
Figure 8:
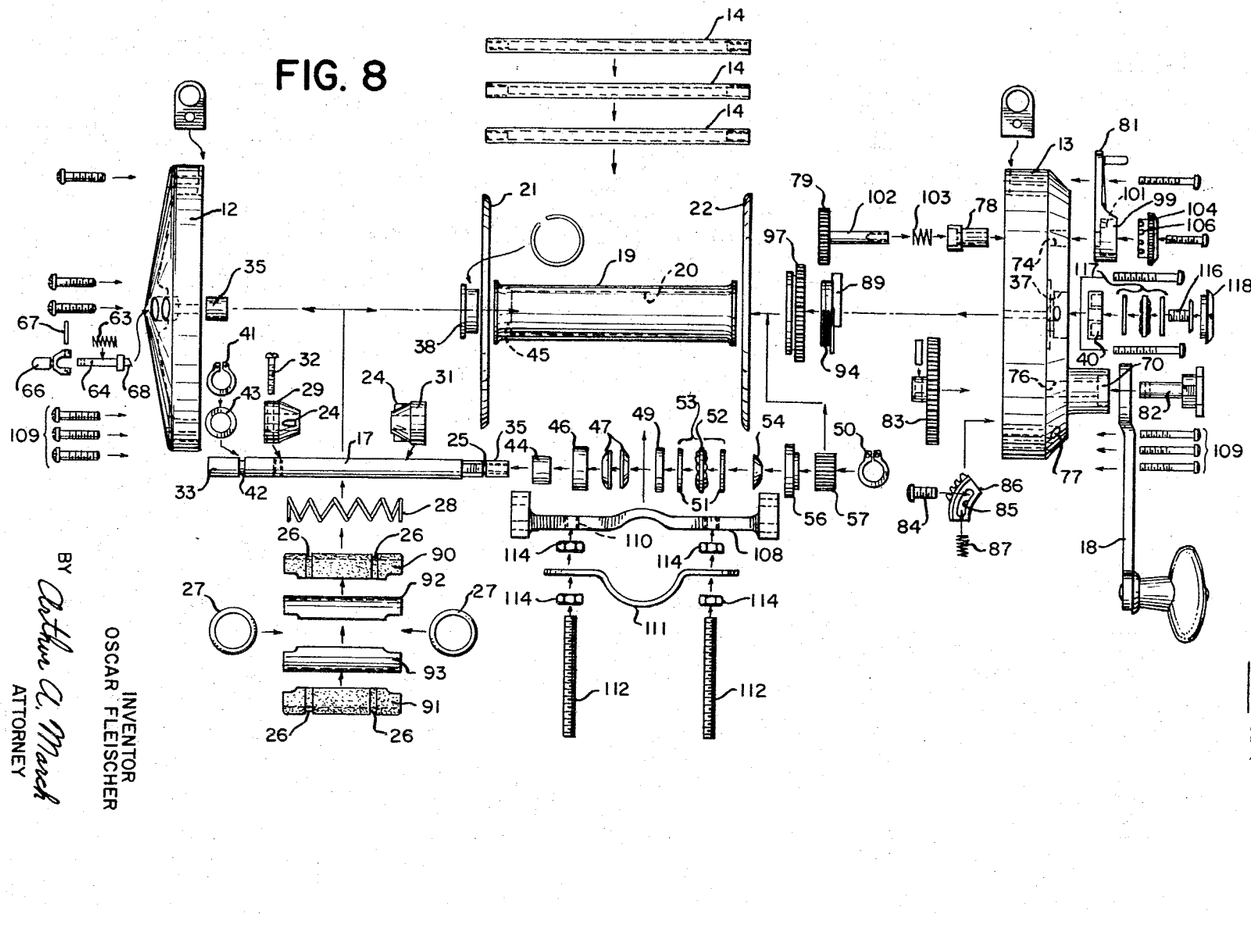
FIG. 8 is an exploded elevation view of the reel shown in FIG. 1 with the assembly of the parts being indicated by arrows and some parts, as indicated, being rotated ninety degrees for clarification.

Referring more particularly to the drawings, wherein like reference characters designate like or corresponding parts throughout the different views, and referring particularly to FIGS. 1 and 2, 11 designates generally a fishing reel comprising a housing having a first end casing 12 and a second end casing 13 joined by supporting members 14, a spool 16 rotatably disposed between the end casings 12 and 13 on a shaft 17, which can be seen in FIG. 8, and a driving member 18, which is operably connected to the shaft 17 for rotating the spool 16.

Figure 6:
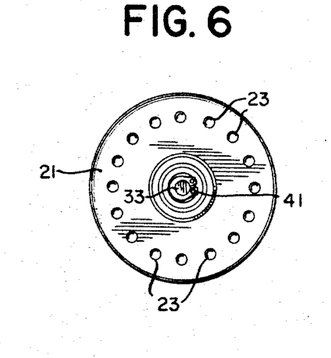
FIG. 6 is a side elevation view of the spool shown in FIG. 4 and looking in the direction of the arrow 6.
Figure 7:
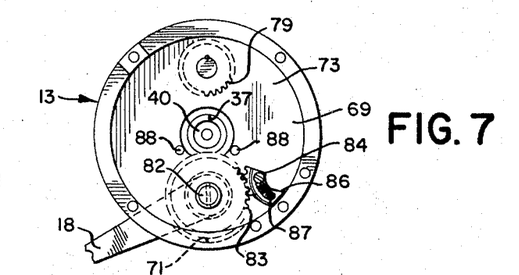
FIG. 7 is a side elevation view of FIG. 5 and looking in the direction of the arrow 7.

The spool 16 comprises a pair of flanges 21 and 22 with a hub 19 disposed therebetween, said hub having an axial bore 20 therethrough and an enlarged recess 45 at one end thereof defining a shoulder. The spool 16 is adapted to rotate on bearings, to be described hereinafter, that are mounted on the shaft 17, which is insertable in the bore 20. The exterior surface of the spool flange 21 is provided with a series of dimples 23 defining a circle, as can be seen in FIG. 6, having a purpose to be described hereinafter. When inserted in the spool 16 in the assembled invention, the shaft 17 is supported at the first end 33 by a bearing 35 provided in a socket 34 located in the casing 12, and at the second end 36 in a bearing 40, which is provided in a hole 37 in the casing 13.

Figures 9, 10, 11, 12:
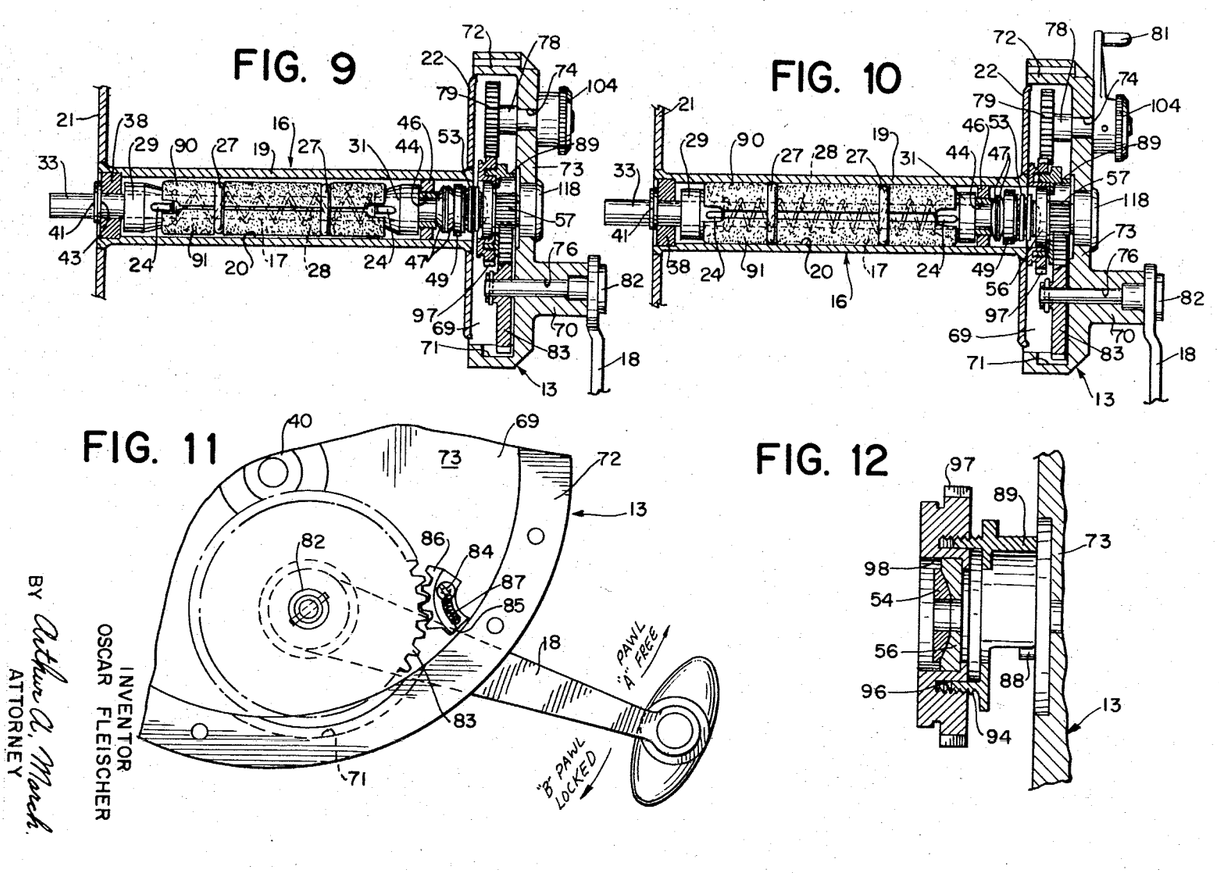
FIG. 9 is a partial cross-sectional of the reel shown in FIG. 1 taken along a center line of the spool and showing a brake in a normal position.
FIG. 10 is a partial cross-section of the reel shown in FIG. 1 taken along a center line of the spool and showing the brake in an operative position.
FIG. 11 is a partial side elevation view of FIG. 7.
FIG. 12 is a side elevation view in cross section of certain parts described more fully hereinafter.

As best seen in FIGS. 9 and 10, a brake is mounted on the shaft 17 and normally disposed within the hub 19 of the spool 16, said brake being adapted to adjustably engage the interior surface of a bore 20 in the hub 19 and thereby offer varying degrees of frictional resistance to rotation of the spool 16. The brake element is cylindrically shaped, being made of any suitable material, such as graphite impregnated cork, and before assembly on the shaft 17, is in two sections 90 and 91, which are bonded to corresponding metal sections 92 and 93 with grooves 26 being provided in the periphery of the brake sections 90 and 91 for receiving a pair of annular springs 27 to retain the brake element in a substantially cylindrical shape when mounted to the shaft 17 over a normally extended coil spring 28, which is disposed thereon. A pair of truncated cone-shaped members 29 and 31, having cylindrically-shaped base portions and being provided with axial bores therethrough, are mounted on the shaft 17 at each end of the brake element with the cone ends thereof confronting one another and extending into the aforesaid brake element, said cone-shaped members 29 and 31 being provided with positioning elements 24 which are adapted to engage the juncture lines of the two sections of the brake element. As can be seen in FIG. 8, one of the truncated cone-shaped members 29 is stationary, being adapted to be locked into position upon the shaft 17 by means of a lock screw 32, and the other truncated cone-shaped member 31 is slideably mounted to the shaft 17. As will be explained more fully hereinafter, the slideably mounted cone-shaped member 31 may be pushed against the brake element causing the truncated cone-shaped members to force the brake to expand and engage the walls of the bore 20 restraining rotation of the spool.

Figure 3:
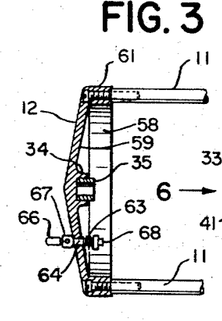
FIG. 3 is a cross-sectional view taken along line 3—3 of FIG. 1 and looking in the direction of the arrows.
Figure 4:
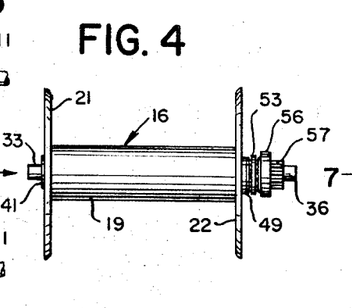
FIG. 4 is an elevation view of the spool designated by the arrow 4 in FIG. 1.
Figure 5:
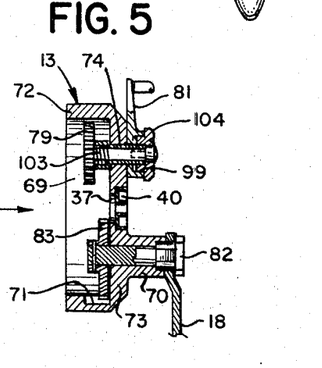
FIG. 5 is a cross-sectional view taken along line 5—5 of FIG. 2 and looking in the direction of the arrows.

Referring to the end casing 12 shown in FIGS. 1, 3 and 8, it has a chamber 58 therein defined by a base 59 and a side wall 61. Centrally disposed in the base 59 is the socket 34 for receiving therein the bearing 35, and a hole 63 therethrough located at a point on a radial line between the center of the base 59 and the side wall 61. In assembly of the end casing 12 and the shaft 17 with its associated parts, the end 33 of the shaft 17 is simply positioned in the bearing 35 which is positioned in the socket 34. A spring biased peg 64 is positioned in the hole 63 and provided with a handle 66 at a pivot pin 67 connection whereby, when the handle is aligned with the peg 64, the spring causes the tip 68 to engage the dimples 23 of the flange 21 making a noise as the spool 16 turns on the shaft 17, and, when the handle is flattened against the base 59, the spring is compressed and the peg 64 is withdrawn from the dimples.

Referring to the end casing 13 shown in FIGS. 5, 7, 8, 9 and 10, it is provided with a chamber 69, having an enlarged arcuate section 71, said chamber 69 defined by a side wall 72 and a base 73. In the base 73 there are provided several holes 37, 74 and 76 and a threaded recess 77 on the chamber side of the base. As previously described, the central hole 37 having a bearing 40 therein supports for rotation the end 36 of the shaft 17 when the device is assembled. Referring to the hole 74, a rotatable member 78 having an axial bore therethrough extends therethrough and has associated therewith a mechanism to be described in the next paragraph. Through the hole 76 there extends a member 82 having affixed at one end thereof in the chamber 69 an enlarged gear 83 which is partially disposed in the enlarged arcuate section 71 and having mounted at the other end thereof the driving member 18 positioned away from the end casing 13 by a spacer 70. In the threaded recess 77, there is provided a screw 84 having an enlarged head, said screw being disposed within an elongated arcuate slot 85 provided in an arcuate gear section 86; there is housed within the slot 85 a normally extending spring 87 which engages the side of the screw 84 and an end wall of the slot to limit and return the gear section 86 whereby it is compelled to remain in the operative position shown in the drawings. In the sidewall 72 of the end casing 13 there are provided a series of holes, corresponding to a similar series of holes in the casing 12, for receiving therethrough screws to engage the members 14, which hold the end casings 12 and 13 together with the spool 16 disposed therebetween. Extending outwardly from the base 73 there is provided a pair of positioning pins 88, see FIG. 7, for engagement with an arcuate collar 89 having a threaded extension 94 and an axial bore therethrough. The threaded extension is adapted to be threadably received in a threaded groove 96 in a gear 97 which is provided with a centrally-disposed interior bore having an enlarged diameter at one end defining a seat 98 for abutment with the enlarged plate surface of the disk-shaped member 56, as will be explained hereinafter. On the wall 72, a reference plate 60 is provided indicating thereon gradient marks for a purpose which is explained hereinafter.

On the end 33 of the shaft 17 there is provided a bearing 38 seated in the recess 45 of the hub 19 in abutting relation to the base portion of the truncated cone-shaped member 29. The outside diameter of the bearing 38 is in tight engagement with the bore 20 with the shaft 17 being free to rotate within an axial bore therethrough. An outside U retainer 41 received in an annular groove 42 in the shaft 17 locks the bearing 38 into position and spacer elements 43 may be used as required. The second end 36 of the shaft 17 is receivable in the axial bore of the bearing 40, with the end of the shaft 17 having therein a threaded recess for receiving a screw 116 having an enlarged head. When assembled, a thrust bearing 117 is disposed on the screw 116 between the enlarged head and bearing 40, and a finished flush fit cap 118 is provided.

Referring to the second end 36 of the shaft 17, there are provided thereon the following series of elements, which are positioned in the following order extending outwardly between the base portion of the slideable truncated cone-shaped member 31 and an outside U retainer 50 which is locked into an annular groove 25 in the shaft 17; a slideable oil-impregnated inner bearing 44 is disposed within an outside bearing 46 having an axial length less than that of the inner bearing 44 and having an outside diameter substantially corresponding to the inside diameter of the bore 20, whereby the oil-impregnated inner bearing 44 is adapted to rotate freely within the outside bearing 46 and is slidable upon the shaft 17; a pair of slideable confronting annular springs 47; slideable spacer elements 49, as may be required; a slideable thrust bearing comprising a pair of hardened disk-shaped washers 51 having disposed therebetween a ball-bearing container 53; a slideable self-aligning thrust washer comprising a cup-shaped member 54 adapted to be received within a disk-shaped member 56 having a cup-shaped recess on one side thereof confronting the member 54 and an enlarged plate surface on the other side thereof; and a stationary spur gear 57 keyed to the shaft for rotation therewith.

As can be seen in FIG. 8, the mechanism associated with the rotatable member 78 comprises; an indicator 81 having an enlarged cylindrically-shaped portion 99, provided with a recess and a stud 101 projecting therein, which is affixed by securely positioning it over the end of the member 78 on the exterior face of the end casing 13; a gear 79 having an extension 102 provided with a threaded axial recess in the end thereof and having a coil spring 103 thereon passed through the axial bore of the member 78; and cap 104 having a cylindrical extension projecting into the recess with said extension having therein a series of drilled pockets 106 for engaging the stud 101; and a screw threaded into the axial bore, whereby the cap 104, indicator 81, and gear 79 form a rotatable unit in the member 78 for turning the gear 79, which may be rotated by pulling the unit outwardly with respect to the base of the casing 13 overcoming the coil spring 103 with the stud 101, thereafter being receivable in a different pocket of the series 106, or alternatively, which may be rotated by moving the indicator 81 which transmits rotation to the gear 79 through the stud 101.

In operation, rotation of the driving member 18 will cause the gear 83 affixed at the other end of the arm 82 to rotate the gear 57 which is keyed to the shaft 17, thereby turning the spool 16, provided the brake engages the hub 19, thereby winding in line on which a fish is presumably hooked. A tension force exerted by a fish on a line will not cause the driving member 18 to rotate in the opposite direction irrespective of the amount of force ordinarily exerted by a fish because the gear section 86 will be thrust into abutting relation with the side wall 72 preventing rotation of the gear 83. The spool 16, however, will rotate in the opposite direction in response to a force exerted on the line if the force exerted on the line exceeds the force exerted by the brake housed in the hub 19. The amount of force to be exerted by the adjustable brake will depend upon the size and type of fish which is being sought or which is on the end of the line and the brake can be set by rotating the indicator knob 81 to a position corresponding to a predetermined referenced selection or mark on the indicator reference plate. Rotation of the indicator knob 81 causes rotation of the gear 79 on the other end of the extension 102. Since when assembled the gear 79 meshes with the gear 97, which is in threaded engagement with the non-rotatable collar 89, the rotation will cause the gear 97 to move inwardly on the threaded section 94, which is rigidly attached to the annular collar 89 which is in engagement with the positioning pins 88. The axial movement of the gear 97 will be transmitted to the truncated cone 31 which will move axially and in turn force apart the brake sections against the stationary cone 29, from the position shown in FIG. 9, causing them to expand into engagement with the bore 20 of the hub 19 as the force of the springs 27 and 28 is overcome, as shown in FIG. 10. It will be seen that the more the indicator knob 81 is rotated the greater will be the axial travel of the truncated cone 31, and, consequently, the greater will be the braking force exerted by the brake elements. Referring to FIGURE 12, it is important to note that the disk-shaped member 56 is seated in the seat 98 of the gear 97 so that the axial movement of the gear 97 does not interfere with any forward rotation imparted to the fixed spur gear 57 by the driving means 18.

Apart from adjustment of the indicator 81, which may be set at a suitable gradient point on the reference plate 60, the gear 79 may be rotated and the brake rapidly adjusted by turning of the cap 104. In this manner, one using the fishing reel may set the brake at approximately the correct position by turning the cap 104 and making more precise adjustments as required by turning the indicator 81 through the limited arc through which it may turn.

Referring to the dimples 23 in the flange 21, when the handle 66 is disposed flattened against the end casing 12, rotation of the spool will cause no noise; however, if the handle 66 is aligned with the peg 64, rotation of the spool 16 will cause an alarming noise as the tip of the peg bounces in and out of the dimples of the rotating spool as a fish takes the line over the resistance of the brake described hereinbefore.

The reel is provided with a reel seat 108 which is disposed between the end casings 12 and 13 and mounted thereto by means of screws 109, said reel seat being provided with two threaded holes 110 therein. A reel seat clamp 111 is mounted to the reel seat by means of threaded studs 112 with suitable lock nuts 114 being provided to fasten them together.

FIGS. 13 through 20 illustrate a modified brake construction for use in a fishing reel 200 of the kind disclosed in FIG. 1. In this form of the invention, the fishing reel 200 comprises a pair of end housings 201, 201A similar to those in FIG. 1. rotatably disposed between the end housings of the reel is a spool 202 having an elongated hub portion 203 and connected end flanges 204 as previously described.

Figure 13:
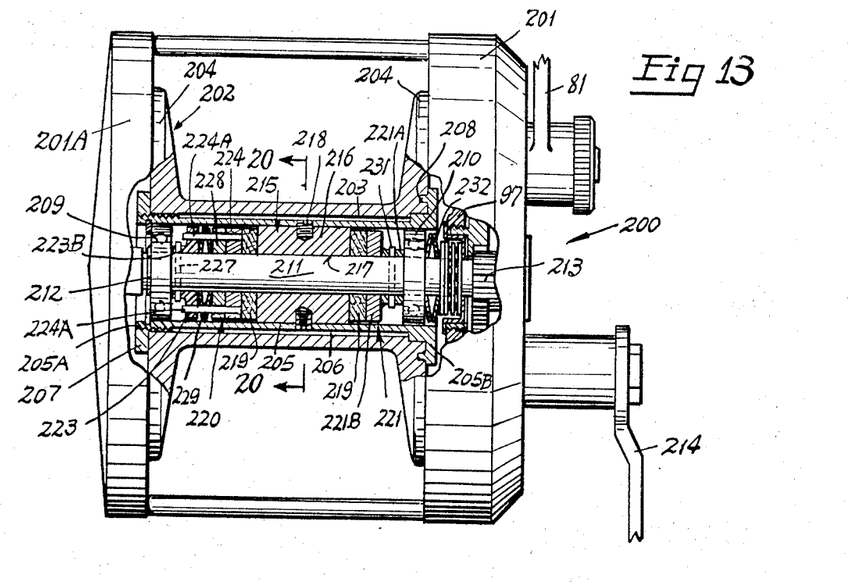
FIG. 13 is a partial, sectional view of a modified brake construction.
Figure 14:
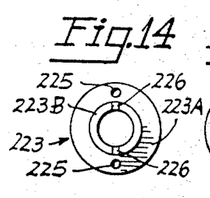
FIGS. 14, 15, 16, 17 and 18 are detailed end views of various component parts of the brake construction of FIG. 13 as will hereinafter be described.
Figures 15, 16:
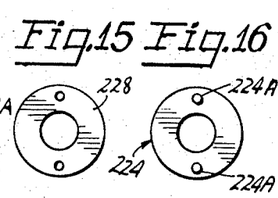
Figures 17, 18:
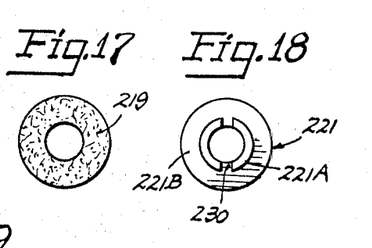
Figure 19:
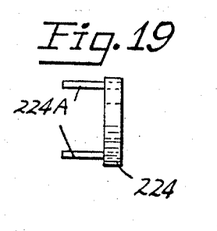
FIG. 19 is a front elevational view of the brake component of FIG. 16.
Figure 20:
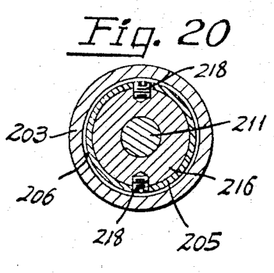
FIG. 20 is a sectional view taken along line 20—20 on FIG. 13.

In this form of the invention, a sleeve 205 is detachably connected within the hub 203 of the spool. As shown in FIG. 13, the sleeve 205 is disposed within the hub so as to define a space 206 between the external surface of the sleeve 205 and the internal surface of the hub 203. In the illustrated embodiment, the sleeve 205 is fixed within the bore of the hub by providing one end of the sleeve with external threads 205A which are adapted to engage with internal threads of a lock nut 207. The other end of the sleeve is provided with a flange 205B. In the threaded position of the sleeve 205, a threaded end position thereof will extend beyond the flange 204 of the spool so that a lock nut 207 may be threaded thereto to secure the same. The flange 205B of the sleeve, in turn, is fixed to the other flange 204 of the spool by suitable pin means 208. While the illustrated embodiment of FIG. 13 discloses a sleeve construction which can be readily, detachably connected to the hub of the spool, it will be understood that the sleeve in an alternate construction can be permanently fixed within the bore or hub of the spool.

Journaled within the sleeve 205 between suitable end bearings 209, 210 is a shaft 211 by which the spool is rotatably supported between the end housings, and by which the spool is driven or rotated when the braking means, to be hereinafter described, is rendered operative. A lock ring 212 adapted to engage in an annular recess formed adjacent one end of the shaft, as hereinbefore described with reference to FIG. 8, is utilized to lock the end bearing 209 onto one end of the shaft 211. The other end of the shaft has connected thereto a spur gear 213 by which it can be rotated. As hereinbefore described, this spur gear 213 is disposed in meshing relationship with a driving gear (not shown) which is driven by the driving member or handle 214 as hereinbefore described with reference to FIG. 8. Thus, the shaft 211 is rotated upon actuation of the driving member 214 through its gear meshing with gear 213.

In this form of the invention, a brake 215 for connecting the sleeve 205 and the connected hub 203 of the spool 202 into driving relationship with the shaft 211 is provided. Accordingly, the brake comprises a series of components disposed about the shaft between the end bearings 209 and 210. The component parts comprise a brake drive block 216 interposed intermediate the length of the shaft 211. As shown, the block 216 comprises a cylindrical member having a bore 217 through which the shaft 211 is extended, and the block 216 is disposed about the shaft so as to be rendered freely rotatable relative thereto. The block 216, in turn, is connected to the sleeve by a screw or the like 218 which extends radially therethrough to thereby prohibit relative rotation between the sleeve 205 and the block 216. The arrangement is such that the brake block 216, the connected sleeve 205, and the hub 203 connected to the sleeve are then free to rotate relative to the shaft 211 when the brake 215 is rendered inoperative.

Disposed about the shaft 211 on either side of the brake driving block 216 is a ring of suitable braking material 219, e.g., asbestos, or the like. The arrangement is such that the respective rings 219 of braking material are arranged so as to bear against the opposed ends of the block 216 when the brake means are actuated. Accordingly, the rings 219 of braking material can be either free floating about the shaft 211 or else connected or fixed to either a driving flange or member to be hereinafter described, or the driving member or block 216. Thus, as it will become hereinafter more evident, the brake construction is such that no pressure is brought to bear on the hub or spool, per se, when the brake is actuated since the braking pressure is concentrated solely upon the ends of the block 216 as will be hereinafter described.

In accordance with this invention, the brake drive block 216 and the respective braking material 219 disposed on either side thereof are sandwiched between a pair of relatively axially movable front and back pressure or driving means 220 and 221, respectively.

In the illustrated embodiment, the back pressure means 220 adjacent the left end of the shaft, as viewed in FIG. 13, comprises a flanged collar 223 disposed about the shaft and a cooperating ring member 224 arranged to bear on one of the braking rings 219. The ring member 224 is provided with a pair of laterally projecting pins 224A disposed in parallel to the axis of the shaft, and the flange 223A of the collar member 223 is arranged with aligned apertures 225 for receiving the pins 224A. The collar portion 223B of the back pressure plate 223 is provided with a pair of opposed, slotted apertures 226. Accordingly, the back pressure member 223 is secured to the shaft 211 by a pin 227 extending through the slotted aperture 226 and shaft so as to prohibit relative rotation therebetween.

Interposed between the respective complementary members 223, 224 of the back pressure means 220 is an insulating disk 228 and a pair of conical springs 229, the latter maintaining a constant spring pressure on the backing member.

The front pressure member 221 comprises a collar 221A having a flanged portion 221B arranged to engage the disk 219 of braking material disposed adjacent thereto. The collar portion 221A of the front pressure member is also provided with a pair of opposed slotted openings 230, as best viewed in FIG. 18, for receiving a pin 231 which extends diametrically therethrough for securing the front pressure plate 221 relative to the shaft 211 to prohibit relative rotation therebetween, yet be free to be axially displaced along said shaft. Conical springs 232 are also disposed about the shaft to maintain spring pressure on the backing pressure member 221.

In accordance with this invention, an indicating means similar to indicating knob 81 of FIG. 8 is utilized for varying or controlling the amount of braking pressure acting on the brake driving block 216 of the brake assembly 215 described. As hereinbefore described, the braking pressure is controlled by effecting rotation of knob 81 which, in turn, causes a gear 79 (not shown in FIG. 13) on the other end of an extension 102 (not shown in FIG. 13) on the knob 81 to mesh with a gear 97 which in turn, is threadedly engaged with a non-rotatable collar as herein described. Thus, the relative rotation therebetween causes gear 97 to move inwardly on the threads of section which is rigidly attached to the annular non-rotatable collar. The axial movement of gear 97 is then transmitted to the respective pressure member to effect relative movement thereof axially of the shaft and thereby to exert a frictional braking force whereby the ring of braking material 219 connects the driving or pressure plate into driving relationship with the drive block and connected spool. Since the respective pressure members are keyed to the shaft, they will effect a driving force when the brake is actuated and thus effectuate a friction drive of the brake drive block 216.

In operation, rotation of the driving member 214 will cause the gear fixed to the other end of its arm to rotate the shaft through gear 213 and the turning of the spool 202, provided that the brake 215 is energized to thereby wind a line on which a fish is presumably hooked. Accordingly, the tension force exerted by the fish on the line will not cause the driving member 18 to rotate in an opposite direction, irrespective of the amount of force ordinarily exerted by the fish, because the gear sector 86 (not shown) will be thrust into abutting relationship with the side wall of the housing as hereinabove described with reference to FIG. 8. The spool 202, however, will rotate in an opposite direction in response to a force exerted on the line, if the force exerted thereon exceeds the force exerted by the brake housed within the hub. Thus the amount of force to be exerted by the adjustable brake 215 will depend upon the size and type of fish which is being sought or which is on the end of the line; and the brake can be set by rotating the indicating knob 81 to a position corresponding to the referenced selection on the indicator reference plate as herein described. It will therefore be seen that the more the indicator knob is rotated, the greater will be the relative axial movement of the pressure or driving members and, consequently, the greater will be the braking force which is exerted on the brake elements.

FIGS. 21 through 28 illustrate a further embodiment of the invention. In this form of the invention, the spool 300 is rotatably supported between a pair of end housings 301 and 301A as hereinbefore described with reference to FIG. 13. In this form of the invention, the spool 300 is also provided with a sleeve 303 which is concentrically disposed within the hub 302 of the spool 300 in a manner similar to that described with reference to FIG. 13. In this form of the invention the construction of the brake means 304 is modified. As shown, the brake 304 comprises a plurality of components disposed along the shaft 305 which is provided on the exterior surface thereof with a plurality of longitudinally extending splines or grooves 305A. The internal surface of the sleeve 303 is also provided with at least a pair of oppositely disposed splines or grooves 303A, the reason for this will be hereinafter brought out. As shown, one end of shaft 305 is provided with a reduced end portion 305B which is rotatably journaled in a bushing 306 supported by a bearing 307. A spacer 307A positions the bearing 307 against a shoulder 303C and a lock ring 303D secures the bearing in place. A lock screw 305C secures the reduced end 305B of the shaft in position.

Figure 21:
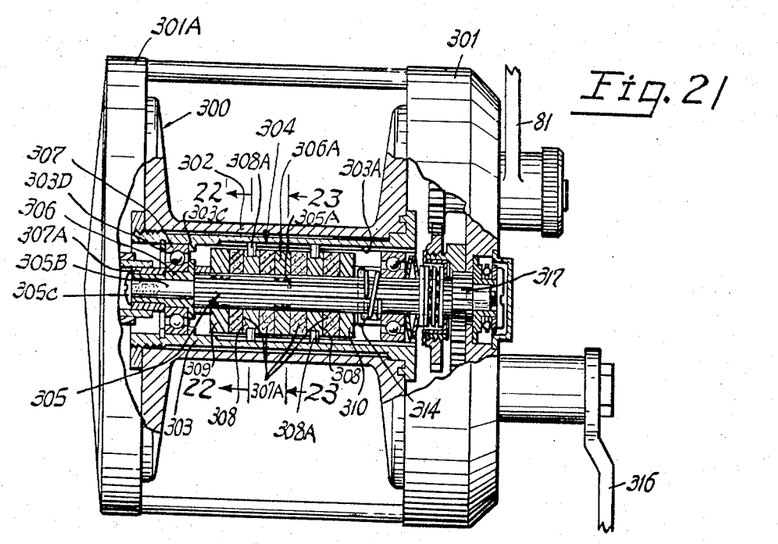
FIG. 21 is a partial sectional view taken through another modified brake construction.
Figure 22:
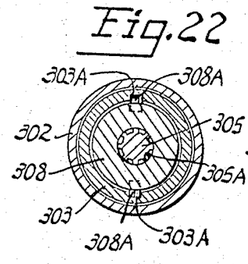
FIG. 22 is a sectional view taken along line 22—22 of FIG. 21.
Figure 23:
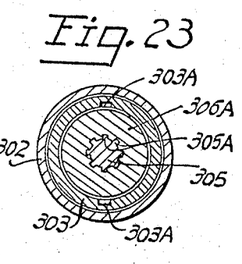
FIG. 23 is a sectional view taken along line 23—23 of FIG. 22.
Figure 24:
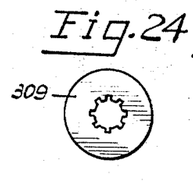
FIGS. 24, 25, 26, 27 and 28 are detailed end views of various component parts of the brake construction of FIG. 21, as will be hereinafter described.
Figure 25:
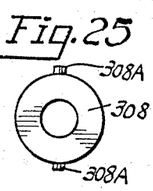
Figure 26:
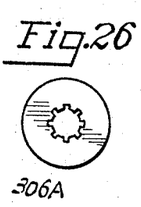
Figure 27:
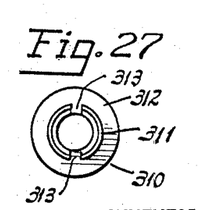
Figure 28:
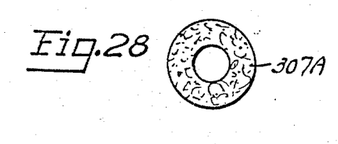

In this form of the invention, a driver disc 306A is keyed to the splined shaft 305. Disposed about the shaft 305 on either side of the driver disc 306A is ring 307A of suitable braking material, as for example asbestos or the like. Disposed to the outboard side of the respective rings of braking material 307A is a driven ring 308 which is keyed by radially extending projections 308A to the grooves or splines 303A formed on the internal surface of the sleeve 303. Located to the outboard side of each of the driven blocks 308 is another ring 307A of suitable braking material, as for example, asbestos or the like.

A front and back pressure means 309 and 310 is disposed about the shaft so as to sandwich therebetween the drive disc 306A, driven discs 308A and the respective alternately disposed rings 307A of insulating material disposed therebetween. Accordingly, each of the front and back pressure members 309 and 310 comprises a collar 311 having a connected flange portion 312, the latter being disposed in contiguous relationship to the end-most ring member 307A. The collar portion 311 of the pressure member 310 is also provided with suitable apertured slots 313, oppositely disposed and arranged in alignment with a diametric bore formed in the shaft through which a suitable lock pin 314 is extended transversely of the shaft to pin the respective pressure members to the shaft for relative axial movement therealong. The shaft 305 in turn is geared to the driving member or handle 316 in a manner hereinbefore described, and a suitable indicating knob or means 81 is provided for varying the braking pressure on the brake means in a manner as herein described.

From the foregoing description, it will be apparent that the braking pressure exerted between or onto the respective braking components 306, 307, 308, 309 and 310 can be varied in accordance with the axial displacement of the pressure members 309 and 310 relative to each other in a manner similar to that hereinbefore described. Thus, in operation, rotation of the driving member 316 will cause the gear fixed at the other end of its arm to rotate the gear 317 keyed to the shaft thereby turning the spool, provided the braking means disposed within the hub thereof is actuated.

The spool 300 of FIG. 21 is also provided with means so as to prevent the driving member from rotating in the opposite direction irrespective of the amount of force ordinarily exerted on the line being wound. This is attained by a gear sector (not shown) similar to that of 86 described with reference to FIG. 1. However, the spool 300 will rotate in an opposite direction in response to a force exerted on the line of the force exerted on the line exceeds the force applied by the brake housed within the hub. The amount of force to be exerted by the adjustable brake will depend upon the size and type of fish which is being sought or which is on the end of the line, and the brake can be set by rotating the indicating knob 81 to a position corresponding to a predetermined pressure ratio as indicated on the indicator reference plate located thereon. Thus, rotation of the indicating knob 81 will cause axial movement of the respective pressure means 309 and 310 as hereinbefore described. The pressure means 309 and 310 keyed to the shaft will exert sufficient compressive force or pressure on the braking rings 307A to frictionally connect the drive block 306 and the pressure members 309 and 310 into relative driving relationship with the driven members 308 keyed to the sleeve and connected hub. It will thus be apparent that the amount of braking pressure exerted between the respective component parts thereof can be controlled by the predetermined setting of the indicating knob 81 as hereinbefore described.

In the described embodiments, the braking elements 307A can be made either free floating or they may be connected to either of their adjacent components by means of suitable bonding means such as screws, adhesive, and the like.

With the construction described, the reel can be simply serviced because of the ease with which the braking material and the various component parts thereof may be repaired or replaced if required. The reel is relatively inexpensive to produce because of the simplicity of its mechanism, the relatively small number of parts, and the ease with which the respective parts can be assembled. Since the braking mechanism is completely enclosed within the hub, foreign matter is prohibited from entering and thereby the useful life of the reel is extended over a considerable period of time.

From the foregoing description it will be noted that the spool can be readily removed from the brake mechanism in a relatively simple manner by merely turning the lock nut to release the spool. Accordingly, a fisherman can derive added benefit in that he can now easily interchange a variety of different spools to the brake mechanism described and thus have readily available a number of different size and kinds of lines at his disposal. Thus in a matter of seconds the spool may be interchanged with another as the type of fishing or fishing conditions change. Also if a line should break, a fisherman can substitute a new full spool for the spool with the broken line. The interchanging of spools accordingly can be effected without any need to take apart or upset the brake mechanism.

While the instant invention has been described and shown with reference to several embodiments thereof, it will be understood and appreciated that other variations and modifications may be made without departing from the spirit or scope of the invention.

I claim:

1. A fishing reel comprising:
   (a) a pair of spaced apart end housings,
   (b) supporting members connected between said spaced end housings,
   (c) a spool having a hollow hub and connected end flanges disposed between said end housings, at least one of said end flanges having aperture means,
   (d) a shaft for rotatably supporting said spool between said end housings,
   (e) a drive means operatively connected to said shaft to effect rotation of shaft,
   (f) a braking assembly disposed within said hub for connecting the spool into driving relationship with said shaft,
   (g) said braking assembly including a sleeve concentrically disposed within said hub having a cylindrical portion in spaced relationship thereto,
   (h) said sleeve having a radially extending end flange with axially directed pin means thereon adapted to cooperate with said aperture means to fix said sleeve to said spool whereby said sleeve rotates with said spool, lock means connected to the sleeve at an end opposite said pins to maintain said pins in said aperture means,
   (i) a pair of spaced apart bearing means for rotatably journalling said shaft within said sleeve, (j) a pressure means disposed in axial spaced relationship along said shaft, (k) a braking means mounted for free rotation about said shaft, said braking means engaging said pressure means, (l) means for fixedly connecting said braking means to said sleeve, (m) a spring means acting on said pressure means, (o) and means for effecting relative axial movement between said pressure means and said braking means so as to vary the axial braking force transmitted through said braking means for connecting said spool into frictional driving relationship with said shaft when said pressure means is actuated toward said block.

2. A fishing reel according to claim 1, wherein said braking means is in the form of a block and said means for fixedly connecting said braking means to said sleeve includes screw means.

3. A fishing reel according to claim 1, wherein said braking means include a plurality of spaced apart plates.

4. A fishing reel comprising:
(a) a pair of spaced apart end housings,
(b) supporting members connected between said spaced end housings,
(c) a spool having a hollow hub and connected end flanges disposed between said end housings,
(d) a shaft for rotatably supporting said spool between said end housings,
(e) a drive means operatively connected to said shaft to effect rotation of shaft,
(f) a braking assembly disposed within said hub for connecting the spool into driving relationship with said shaft,
(g) said braking assembly including a sleeve concentrically disposed within said hub,
(h) means for fixedly connecting said sleeve to said hub to prohibit relative rotation therebetween,
(i) a pair of spaced apart bearing means for rotatably journalling said shaft within said sleeve,
(j) a front and back pressure means disposed in axial spaced relationship along said shaft,
(k) a braking block mounted for free rotation about said shaft, said block being disposed between said front and back pressure means,
(l) means for fixedly connecting said block to said sleeve,
(m) a braking ring disposed between said block and the respective front and back pressure means,
(n) a spring means acting on said pressure means,
(o) and means for effecting relative axial movement between said front and back pressure means so as to vary the axial braking force transmitted axially through said braking ring onto the ends of said block disposed therebetween for connecting said spool into frictional driving relationship with said shaft when said pressure means are actuated toward said block,
(p) the back pressure means including a pair of complementary members, one of said members including a first ring member disposed about said shaft adjacent one end thereof, said ring having a pair of connected drive pins, a complementary flanged collar member, the flange of said collar member having an aligned opening for receiving the drive pins of said first ring member.

5. The invention as defined in claim 4 and including spring means disposed between said pair of complementary members.

References Cited

UNITED STATES PATENTS

| 842,551 | 1/1907 | Hunter | 242—84.46 |
| 1,547,238 | 7/1925 | Russell et al. | 242—84.44 |
| 2,150,088 | 3/1939 | White | 242—84.44 |
| 2,190,398 | 2/1940 | Bugatti | 43—21 |
| 2,282,995 | 5/1942 | Dumond | 242—84.44 |
| 2,476,437 | 7/1949 | Whisman | 242—84.45 |
| 2,531,610 | 11/1950 | Butzman | 192—14 |
| 3,017,135 | 1/1962 | Wood | 242—84.54 |
| 3,184,179 | 5/1965 | Wood | 242—84.45 |

BILLY S. TAYLOR, *Primary Examiner.*

U.S. Cl. X.R.

242—84.5